(12) United States Patent
Liao et al.

(10) Patent No.: US 6,358,407 B1
(45) Date of Patent: Mar. 19, 2002

(54) HIGH TURBIDITY WASTEWATER PURIFICATION SYSTEM

(76) Inventors: Taiouan Liao; Chunjiang Liao; Manhoi Lam, all of 3626 College Blvd., Number 26, Oceanside, CA (US) 92056

(*) Notice: Subject to any disclaimer, the term of this patent is extended or adjusted under 35 U.S.C. 154(b) by 0 days.

(21) Appl. No.: 09/347,341

(22) Filed: Jul. 2, 1999

(51) Int. Cl.$^7$ .............................................. C02F 1/52
(52) U.S. Cl. .................. 210/97; 210/110; 210/195.1; 210/196; 210/199; 210/202; 210/203; 210/220; 210/256; 210/257.1; 210/258; 210/265; 210/275; 210/284
(58) Field of Search .............................. 210/661, 712, 210/715, 738, 807, 97, 202, 195.1, 199, 203, 205, 220, 256, 257.1, 258, 260, 262, 110, 196, 265, 275, 284

(56) References Cited

U.S. PATENT DOCUMENTS

| | | | |
|---|---|---|---|
| 3,313,725 A | * 4/1967 | Tsuda et al. | 210/715 |
| 3,523,889 A | * 8/1970 | Eis | 210/715 |
| 3,524,810 A | * 8/1970 | Mackrle et al. | 210/715 |
| 4,146,471 A | * 3/1979 | Wyness | 210/20 |
| 4,448,585 A | * 5/1984 | Yoo | 44/51 |
| 4,603,000 A | * 7/1986 | Casey | 210/715 |
| 4,793,934 A | * 12/1988 | Thompson et al. | 210/715 |
| 4,865,751 A | * 9/1989 | Smisson | 210/788 |
| 5,690,813 A | * 11/1997 | Coale | 210/86 |
| 5,695,645 A | * 12/1997 | Bober et al. | 210/710 |
| 5,698,099 A | * 12/1997 | Fagan et al. | 210/304 |

OTHER PUBLICATIONS

Liao, Rapid Purification By Physicochemical Methods . . . Recycled Paper, Industrial Wastewater Treatment, No. 18 p. 34–35, Jan. 1998.*

* cited by examiner

*Primary Examiner*—Peter A. Hruskoci
(74) *Attorney, Agent, or Firm*—Donn K. Harms

(57) ABSTRACT

A device and method for the filtration and purification of suspended solids from high turbidity wastewater or other fluids using a slow circulating fluid stream flow inside a vessel of fluid containing a mixture of coagulant and suspended solids. By determining and using a calculated velocity of the flow of the fluid in the vessel, suspended solids are caused to separate from the fluid in which they are suspended by natural actions of gravity and pressure differentials in the vessel ceasing the rise of the suspended solids. The suspended solids are filtered from the water or other fluid by a filter layer of the suspended solids themselves which form a filter element for the fluid at a determined level in the vessel wherein suspended solids are separated and drain back though a return orifice leaving cleansed fluid to rise through a secondary filtration system of buoyant balls floating at a higher lever. Additional filtration of fluid and condensation of solids into sludge is achieved using an optional second return conduit to leach additional fluid from solids drained into the return orifice from the first filtration layer of suspended solids.

17 Claims, 5 Drawing Sheets

HIGH TURBIDITY WASTEWATER PURIFICATION SYSTEM

BACKGROUND OF INVENTION

1. Field of Invention

The present invention relates to purification of water. More particularly, it relates to a device and method for purification of water which has been severely contaminated with particulate and other contaminants such as water from sewage treatment plants, slaughterhouses, foundries, coal pits, and similar venues which traditionally deal with water that is highly contaminated. The device and method herein disclosed features a mechanism for the purification of water of high turbid entering the system, and a unique method of purification of such a high turbidity stream.

Using a combination of mixing of coagulants with the high turbidity fluid stream entering the device, along with a slow circulating fluid stream inside of a unique vessel designed to react to the slowly circulating coagulated fluid stream, the device is capable of a high degree of purification of even the most contaminated water.

2. Prior Art

Highly contaminated water is a byproduct of industrialized societies. Whether it be the sewage created from the mixing of human on other waste products in a sewage collection system from home drains and toilets, or, water contaminated from blood and carcases at slaughterhouse, or, other water contaminated by some other manufacturing plant, processing wastewater of high turbidity, back to a purified form, is a constant and vexing problem for government and industry. The sewage and effluent so created is frequently so contaminated that it is harmful to the environment and to the health of just about any living thing encountering the high turbidity fluid stream.

Ever increasing government standards for discharge water from sewer plants, factories, and manufacturing facilities, is increasing the strain on current systems and methods for purification of high turbidity water streams. This is especially true in the United States and other highly industrialized countries where environmental concerns have caused ever tightening standards for the cleansing of the high volumes of severely polluted water generated in such economies. As developing nations mature, the problem will only increase.

A popular conventional method of dealing with sewage, involves in some cases, sludge ponds where a slurry of water and contaminants piped thereto are cleaned using evaporation and enzymes which concentrate the particulate and other contaminants into ever more dense sewer sludge. The water is separated from the sludge and filtered and generally discharged into the ocean or some other water body. This method is both highly inefficient because of the large amounts of land involved in sludge ponds, and costly due to the extended time required of the sludge to age in the ponds. This method alas also yields water that is still somewhat contaminated. Further still, the method is not a popular manner to handle such wastewater with surrounding residents due to the propensity of the sludge ponds to propagate offending odors, especially in the summer months. To the unfortunate neighbor downwind, such a method of handling sewage waste can be an olfactory nightmare.

Most such conventional wastewater purifiers can only handle wastewater with suspended solids with a turbidity of less than 500 mg/l. When processing wastewater these conventional purifiers have low purifying rates which yield long processing times, and, they consist of large and very expensive mechanical structures. These conventional devices and processes work primarily with the principal of gravity sedimentation or the use of filters. As a general rule, water treated in this manner is still disposed of as it is considered non consumable by man or animal.

Many municipal and industrial wastewater facilities consistently encounter wastewater with turbidity over the 500 mg/l and even up to 5000 mg/l. Because of ever this ever increasing flow of dirtier sewage and other high turbidity wastewater streams, and stagnant or diminishing municipal and industrial facilities to process increasing flows, novel methods and devices have arisen in recent years in attempts to process and clean the ever increasing rivers of sewer water and other water of high turbidity. Such methods include the use of live shrimp in sludge ponds to devour the contaminants and speed the fluid flow, to the use of reverse osmosis filters to remove contaminants. Unfortunately the water the shrimp are subjected to, sometimes is even too contaminated for them causing their untimely demise. The particulate and other contaminants encountered by reverse osmosis filters in such conditions continually clog the fine membranes used to filter contaminants. Such failures contribute to the high cost of processing high turbidity wastewater streams.

Other mechanisms have also arisen in attempts to more efficiently handle increasing effluent fluid flows. Such mechanisms include machinery using hydrodynamics, paddles, and similar mechanical means to help separate water from particulate and other contaminants therein. Such prior art has attempted to address some of the aforementioned problems and solutions but without great success.

U.S. Pat. No. 5,690,813 (Coale) teaches an apparatus for separating contaminated waste water using a centrifuge. This device uses a high speed fluid flow and the natural action of centrifugal force, to separate heavy solids from water. The particulate is then directed against vanes at the circumference and collected in a sump. However, Coale is a complicated array of baffles possibly subject to clogging and requires a high speed circulation of the slurry to effectively separate particulate from fluid requiring high speed pumps.

U.S. Pat. No. 4,865,751 (Smisson) teaches water purification system using centrifugal force and a series of vanes and fluid energy inlets to circulate and purify water. However Smisson is subject to clogging if circulation is not kept to a high enough velocity, and requires a plurality of inlets for energized fluid to maintain sufficient velocity to overcome clogging.

U.S. Pat. No. 5,698,099 (Fagan) discloses a hydrodynamic separator using centrifugally accelerated sludge through a plurality of filter openings to separate solids from liquid. Fagan requires a relatively high speed fluid stream and the filters would be prone to clogging if the fluid steam slows below a certain point or if the particulate clumps onto the filter.

As such, there exists a need for an easily maintained and operated separator to separate particulate and other solids in solutions from the solution itself. Such a device should require a minimal fluid velocity to achieve the separation and thereby require less energy than high fluid velocity systems. The device should also be resistant to clogging and easily maintained to prevent system shut down from clogging. Such a device with low energy requirements and easy maintenance would therefore work better in industrialized and municipal installations, and, lend itself to installation in countries badly in need of water purification but lacking in energy and technical maintenance skills.

SUMMARY OF THE INVENTION

Applicants' system and device feature an easily maintained and utilized apparatus providing for a high degree of purification of high turbidity water and wastewater. In its best mode it utilizes coagulants mixed with incoming wastewater fluid and thereafter entering a purifying vessel to better concentrate the floating solids into larger particles or flocculent. The slurry of coagulant and suspended solid contaminants and water is then circulated at a slow velocity which is sufficient to overcome the gravitational force on the suspended solids and cause the suspended solids in the slurry to rise to a predefined level in the vessel. By carefully maintaining the speed of the liquid circulation, the suspended solids will never rise above predefined level in the vessel. This mode of the device and method of processing wastewater is capable of handling suspended solids in wastewater higher than 500 mg/l and as high as 5000 mg/l directly and continuously.

During their rise caused by the rotating flow of fluid in the vessel, the suspended solids interact with each other and the coagulant and form larger suspended solids commonly called flocculent. It is therefore desirable that the fluid stream circulate slowly to allow more time for such clumping and enlargement of flocculent. Because the device herein disclosed features a slow rotation rate or upward flow speed of the wastewater in the vessel, more time is allowed for the reaction to take place and for the suspended solids to form larger flocculent.

At a determined point of rise of the slurry, the circulation speed of the fluid within the vessel, which is determined by design, will allow the slurry only to rise upward only to the predefined level in the vessel. A first filtration zone is thereby formed of a layer composed of coagulated contaminant suspended solids which have formed into larger flocculent particles and reached the determined point of height in the vessel. Subsequent suspended particles and flocculent in the wastewater stream reach this first filtration zone where they are intercepted by the layer of flocculent and suspended solids already circulating at the first filtration zone level. The circular motion of the wastewater therein acts to force the ever gathering mass of flocculent and suspended solids in the coagulation zone higher.

This rising action forces flocculent and any smaller particles of suspended solids on the upper layer of the first filtration zone to rise over the lip of a centrally located collector around which the slurry circulates. At this point in the height of the vessel, a defecation zone is formed in the vessel where the collector section terminates at the lip of the collector, and is created when the area available for fluid circulation is immediately increased due to the termination of the collector section. Upward circulating flocculent and smaller suspended solids move toward the lip of the collar and are deposited over the lip and into the collector by the circulating fluid stream.

This flow of substantially all of the flocculent and other suspended solids, into the collector, is the result of a number of natural actions. First, the diameter of the collector around which the fluid slurry circulates reduces the area for circulation of the fluid stream around it. The termination of the collector at the lip increases the area present for the path of the upward circulation of the flocculent and suspended solids slowing the upward speed of both by natural action of increased area thereby forming a first filtration zone. This first filtration zone formed of the flocculent and smaller suspended solids forced up from below the filtration zone by the upward circulation of the liquid is also continually drawn into the collector due to the inability of the slower fluid circulation speed to raise the suspended solids where the collector terminates.

As such, the larger flocculent and other suspended solids are forced to a level just over the edge or lip of the collector where gravity and pressure differences caused by the point eddy motion principal, will draw substantially all of the larger flocculent and smaller suspended solids toward the lower presser in the center of the vessel and into the collector. As a consequence the suspended solids and flocculent that are undesirable in the water, become the filter for their own removal therefrom. Additionally, the lower pressure existing in the collector naturally draws the flocculent and smaller suspended solids toward the lower pressure at the mouth of the collector where they fall into the collector. Thus gravity and lower fluid pressure work in concert to remove the flocculent and suspended solids from the wastewater mix and deposit them into the collector. The result being that only water that is substantially free of contaminants and suspended solids to rise further past the lip of the collector.

Clean water continues past the first filtration zone formed of the flocculent and suspended solids to a secondary filtration zone consisting of buoyant ball-shaped components floating at the secondary filter zone in the vessel. Plastic balls of a specific gravity lighter than water work well for this layer as they naturally float to the high level in the vessel. This layer of ball-shaped components serves two purposes. First, it serves as a secondary filtration zone which tends to remove any small remaining suspended solids that may have inadvertently made it past the natural filtration zone at the first filtration zone. Concurrently, the layer of buoyant ball-shaped components, create a pressure differential between the fluid at the bottom of the filtration zone layer and the water exiting the filtration zone layer at the top of the vessel. This is because fluid such as wastewater first encountering the bottom of the layer of ball-shaped components is at a higher pressure than fluid exiting the top or exit of the layer of ball-shaped components in accordance with the filter hydraulic principal. Thus, fluid pressure is higher at the lower or bottom of the filter zone than it is in the middle of the filter zone or exit side of the secondary filtration zone.

Using this naturally occurring principal of pressure differential, the circulation of fluid through the vessel can be additionally enhanced by the addition of return conduits which communicate between the bottom or lower levels of the return or sludge storage cavity which collects the slurry of coagulated solids from the coagulation zone. The communicating conduit will have a slightly lower fluid pressure at the point of communication of the conduit with the return cavity thereby tending to draw water up into the conduit which will exit into an area substantially at the middle portion of the secondary filter zone which is the source of lower pressure. Lower velocity of the fluid caused thereby is however insufficient to force the coagulated flocculent or suspended solids remaining in the slurry up to the level of the secondary filter zone due to the mass of the coagulated solids being too heavy to be overcome by the slow fluid stream in the sludge storage cavity. As such, increased output is achieved of purified water with the addition of the communicating conduits as is additional concentration of the suspended solids removed from the water.

While the device would function without the return conduits, the efficiency of the device is significantly enhanced by their addition and as such, the best mode of the device would feature one or a plurality of return conduits to condense the solids in the storage cavity by removal of additional water therefrom.

The device herein disclosed, uses a slow circulation of fluid inside the vessel and requires minimal energy to operate. By using the pressure differential and eddy principal to separate coagulated solids from circulating lighter liquid, a high degree of filtration is achieved without the need for vanes or filtering screens which might clog thereby decreasing maintenance requirements. Additional efficiency in both purified fluid collection and sludge condensation is achieved with the addition of fluid return conduits. Because of this high efficiency and low power and maintenance requirements, the device would not only be applicable to current municipal and industrial sewage plants, it would be ideal for use in countries where energy available is minimal and technical personnel to complicated devices are not readily available. It could thus be immediately introduced into the stream of commerce to aid in purification of sewage and also of contaminated water into potable or drinking water in third world countries as well as increasing efficiency in industrialized countries. Because the device uses the contaminant itself as a filter, the device is capable of handling water with suspended solids over 500 mg/l and as much as 5000 mg/l which currently cannot be adequately filtered by conventional equipment and methods. Such ability would allow the device to process water from ceramics plants, paper mills, and printing and dying mills, known for high solid content as well as to pre-treat sea water used to cool nuclear power plants to lower the suspended solid content thereof.

An object of this invention is providing a highly efficient water purification system.

Another object of this invention is to provide a high degree of purification using a relatively slow moving fluid stream thus using minimal energy to accomplish purification.

An additional object of the invention is the provision of a device that uses the contaminant itself as the filter material for the contaminant, thereby reducing costs through elimination of filters, grids, and other structures and material normally required.

A further object of this invention is the provision of highly concentrated sludge thereby compacting disposal problems while concurrently yielding high volumes of purified water from incoming contaminated water.

An Additional object of the invention is to provide a device which yields highly purified water from water contaminated by sewage or other contaminants, but has a minimum of maintenance required which can be handled by low skilled personnel.

Another object of this invention is to provide a device for the pre-treatment of seawater used to cool nuclear power plants or later used for reverse osmosis treatment.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
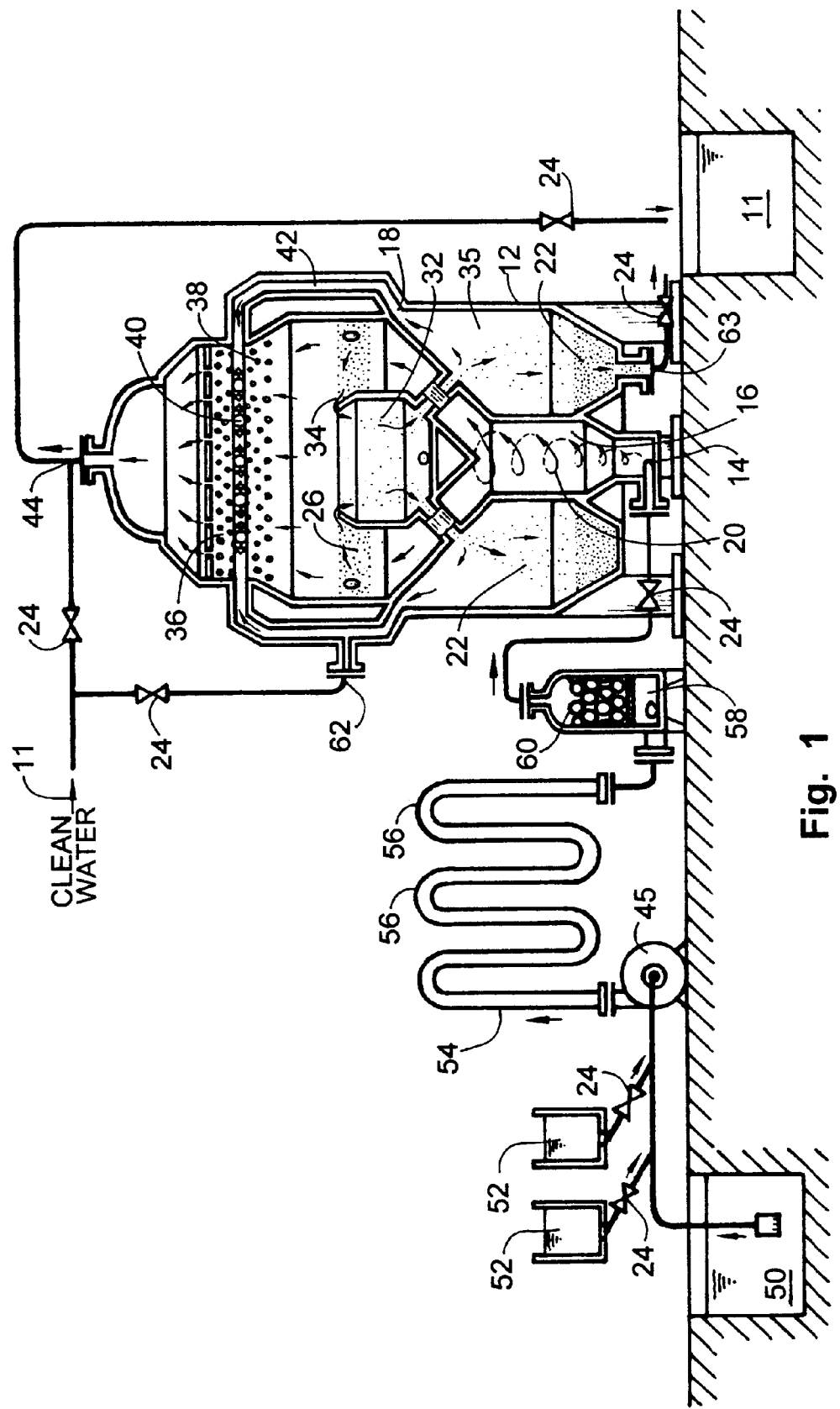
FIG. 1 is a view of the complete and best embodiment of the disclosed device featuring all components hereof.
Figure 2:
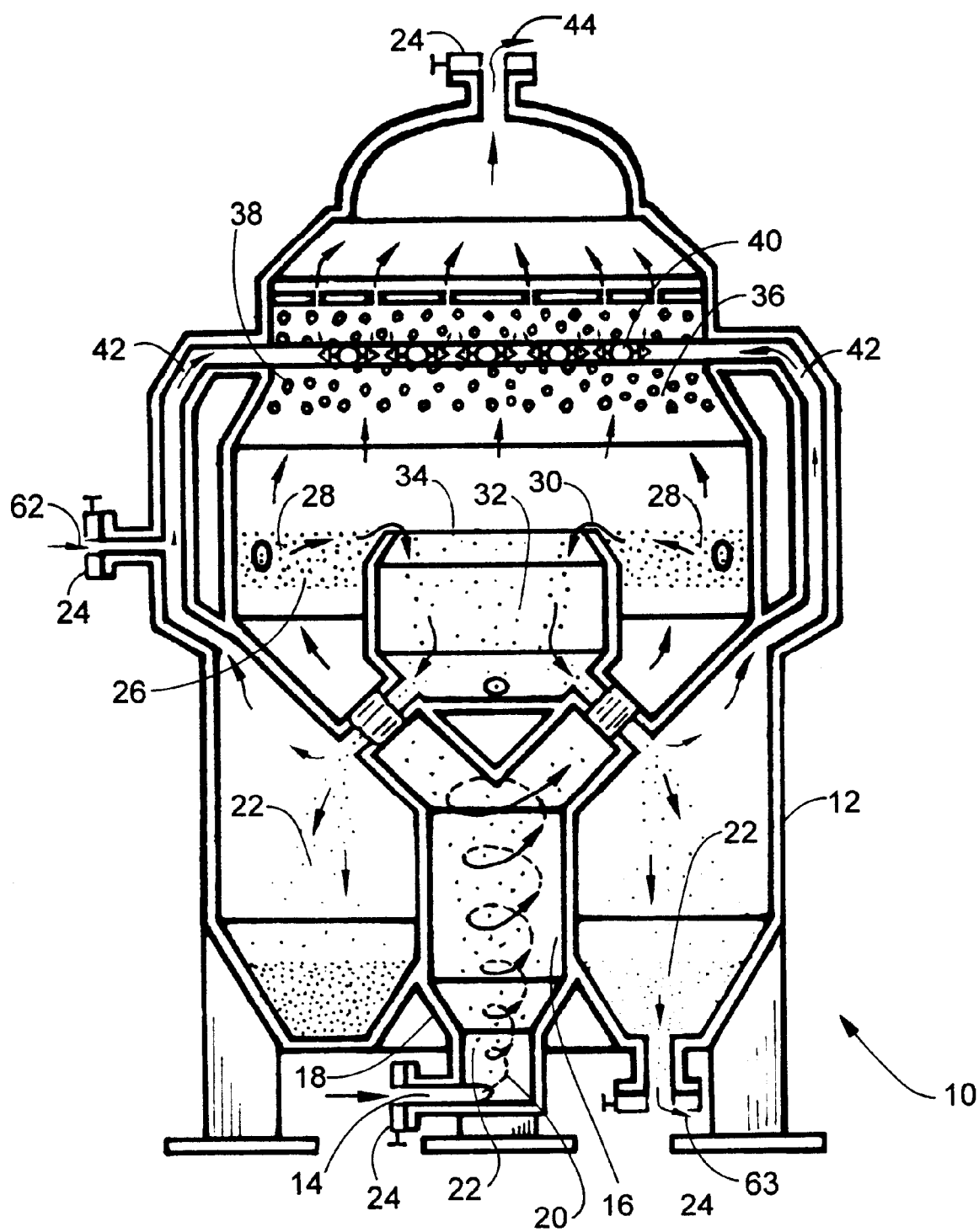
FIG. 2 is a side cutaway view of the vessel and collector system herein disclosed.

Referring now to the drawing FIGS. 1–7, specifically, FIG. 1 and FIG. 2 depict a side cut away view of the wastewater purification device 10 and various components and depict the travel of wastewater through the various filtration levels and conduits and out of the wastewater purification device 10 in an exceptionally clean state.

In use, a mixture of fluid containing concentrations of suspended solids along with coagulants calculated to cause clumping of those solids determined to be in the fluid, such as the fluid exiting a ceramic plant, paper or dying mill, or entering a nuclear power plant or reverse osmosis plant, is pumped into the vessel 12 through an input conduit 14 located at the bottom of the vessel 12. The input conduit 14 is attached to the center cavity 16 of the vessel 12 and communicates through the center cavity wall 18. Conventional sealed connections such as flanges 15 are used to connect all component and conduit connections in a sealed fit. In the current best mode the input conduit 14 is attached to the center cavity wall 18 at an angle tangent to the center cavity 16, and fluid, having been energized by an energizing means in the form of a conventional pump such as a rotary or centrifugal pump, or similar fluid energizing means, is pumped into the bottom of the center cavity 16. The same tangential connection is used with the optional mixing container 58 used in the best embodiment of the device as a pre-mixing chamber prior to entering the center cavity 16. Fluid under pressure so entering the center cavity 16 results in a circular flow 20 of the fluid around the canter axis of the circular shaped center cavity 16. Circular flow of fluid 20 communicated into the center cavity 16 would also occur at other entry angles, but the current best mode features a tangential attachment of the input conduit 14 to yield the best flow characteristics and the lowest loss of energy.

The rotating circular flow 20 of fluid in the center cavity 16 of the vessel 12, causes the suspended solids 22 to circulate upward in the center cavity 16 for a duration of time determined by the velocity of the incoming fluid through the input conduit 14 and the diameter and shape of the center cavity 18. A slow circulation and slow rise of fluid in the center cavity 16 provides more time and chance for the suspended solids 22 to interact with each other and to form larger solids or flocculent. The size of the input conduit 14 and center cavity 16 affect the velocity of the flow 20 as does the consistency of the incoming fluid mixed with solids 22 and the volume and velocity of the incoming flow from the conduit 14 can be adjusted using a conventional throttle style valve 24 attached to the input conduit 14 in a conventional fashion using threaded or other conventional sealed engagement.

The flow being adjusted properly by the user-determined valve 24 setting will yield a determined point of rise of the suspended solids 22, to form a first filtration zone in the vessel. A first filtration zone 26 in the center cavity 16 is thereby formed from a layer the flocculent and other smaller suspended solids 22 themselves, which rise due to circular flow fluid velocity, to the determined point of height in the vessel 16. This determined rise and filter formation is an especially important feature in that no filtration elements need be supplied to the device 10 to operate. In situations where filters would become damaged due to high suspensions of solids such as ceramic plants where the suspended solids can rise above 500 mg/l to potentially 5000 mg/l the device will still yield purified water where other conventional devices using conventional filter elements would fail. The device functions so effectively using the suspended solids themselves as a filter element that it will clean water 11 with suspended solids between 500 mg/l and 5000 mg/l. Suspended solids 22 in the wastewater stream, either alone or clumped into larger flocculent will rise in the circular flow 20 to reach this first filtration zone 26 where they are intercepted by the layer of suspended solids 22 already circulating at the first filtration zone 26 level. The circular motion 20 of the wastewater therein acts to force the ever gathering layer of suspended solids in the first filtration zone 26 higher in the center cavity 16.

This continuous rising action forces the suspended solids 22 on the upper layer 28 of the first filtration zone 26 to rise over the lip 30 of a centrally located circular shaped collector cavity 32. As noted above, at the point above the lip 30 of the collector 32 the collector terminates and the vessel immediately widens the path available to the circulating slurry of water and suspended solids 22. The widening of the flow path slows the speed of the circulating slurry to a point where the upward force on the solids 22 is less than the settling force on the solids 22. Therefor the solids can rise no further and are naturally deposited into the collector cavity 32 over the lip 30 by the natural flow toward the center axis due to the point eddy motion principal causing a central migration of the suspended solids 22.

This flow into the collector cavity 32 is the result of a number of actions. First, the elimination of the center cavity 16 where it terminates at the lip immediately widens the path for the circulating fluid slurry. Lower pressure results naturally at the point of entry into the collector cavity 32 which is the communicating collector orifice.

The suspended solids 22 in the first filtration zone 26, being continually forced upward from below the filtration zone by the upward circular flow 20 and circulation of the wastewater stream are forced to a level just over the edge or lip 30 of the collector cavity 32 where gravity on the higher mass of the suspended solids 22 and the resulting lower pressure at the orifice 34, and the eddy principal, will draw the suspended solids 22 toward the center axis and into the collector cavity 32. Thus gravity, slower fluid circulation and lower fluid pressure in the collector cavity 32 at the orifice 34 work in concert with the eddy principal to remove substantially all of the heavier suspended solids 22 from wastewater mix before the fluid enters a secondary filtration zone 36 higher in the vessel.

Virtually all of the suspended solids 22 fall back into the collector cavity 32 leaving the remaining clean and substantially solid free water or fluid to continue a circular upward motion from the first filtration zone 26 formed of the suspended solids 22, to a secondary filtration zone 36. This secondary filtration zone 36 consists of buoyant ball-shaped components 38 floating at the secondary filter zone 36 in the center cavity 16 of the vessel 12. Plastic balls of a specific gravity lighter than water or the fluid being cleansed, work well for components 38 at this secondary layer or filtration zone 36. Since they have a specific gravity lighter than the circulating fluid and naturally float to the high level in the vessel. This secondary filtration zone 36 is disclosed in this the best mode of the device 10 and while the device will function without it, the device 10 functions better with the employment of the secondary filtration zone 36.

The secondary filtration zone 36 of ball-shaped components 38 serves two purposes. First, it serves as a secondary filtration zone which tends to remove any remaining solids 22 that may have inadvertently made it past the natural filtration at the first zone of filtration 26 which used the solids 22 themselves as the filter element. Concurrently, the secondary filter zone 36 using the natural action of the layer of buoyant ball-shaped components 38, which rise until corralled by containment-screen 40. The containment screen 40 features a plate attached at the inside diameter of the vessel having a plurality of mushroom or triangular shaped elements 41 formed at a lower side 43 of the containment screen 40. This provision of the plurality of such elements 41 allows for additional screen aperture 47 area in the screen 40 and more area for passage of fluid than would be possible if the containment screen 40 were simply flat with apertures. Once past the aperture 47, the fluid exits through communicating drains 49 and continues upward in the vessel 12 toward the exit orifice 44. While the apertures 47 are shown elongated, they might also be holes or ovals. A pressure differential between the fluid at the bottom of the filtration zone layer 42 and the water exiting the filtration zone layer at the top of the vessel 12 just past the containment screen 40 is created by natural action of the fluid flow. This pressure differential results from the action fluid encountering the second filtration zone 36 layer of ball-shaped components 38. As the fluid stream moves through the secondary filtration level 36 it lowers in fluid pressure as it goes higher in the filtration level and is lower still where the fluid stream exits the secondary filter zone 36 in accordance with the filter hydraulic principal. Thus, fluid pressure is higher in the center cavity 16 at the lower or bottom of the secondary filter zone 36 than it is in the center or past of the secondary filtration zone 36. Using this naturally occurring principal of pressure differential and fluid stream acceleration, the circulation of fluid stream through the vessel 12 will not be decreased and can be additionally enhanced by the addition of optional return conduits 42 which communicate between the bottom or lower level sludge storage cavity 35 of the collector cavity 32 which collects the suspended solids 22 from the first filtration zone 26. The communicating return conduit 42 will have a slightly higher fluid pressure at the point of communication of the return conduit 42 with the storage cavity 35 than at its other end where it communicates with the center cavity at substantially the center or middle of the secondary filtration zone 36. The resulting pressure differential and in the fluid stream, naturally draws water up into the conduit which will exit into the middle of the secondary filtration zone 36 where the fluid stream pressure is lower. The low velocity of the fluid stream being drawn upward is however, insufficient to overcome the settling of solids and force the coagulated and suspended solids 22 to the level of the secondary filtraton zone 36 through the return conduits 42 due to the mass of the suspended solids being too heavy to rise in the slower moving fluid of in the storage cavity 35 area. The solids 22 thus continue their settling into the storage cavity 35 section only in higher concentrations of solids 22 since more liquid is removed by the secondary filtration circuit.

As such, increased output is achieved of purified wastewater with the addition of the communicating return conduits 42 as is additional concentration of the solids 22 removed from the water. While the device would function without the return conduits 42, the efficiency of the device 10 is significantly enhanced by their addition, and as such, the best mode of the device would feature one or a plurality of return conduits 42. Also, the provision of a second fluid selectively sealable inlet orifice 62 communicating with said interior cavity at the upper portion of the vessel 12 allows for cleaning by back washing of the secondary filter zone using a flow of clean fluid such as clean water through said second fluid inlet orifice 62, and/or optional selectively sealable auxiliary inlet orifices 61 and/or through exit orifice 44, depending on the amount of flow desired, which will clean any stray solids 22 caught in the secondary zone. This cleaning would be done with the device not being run for water cleansing and the removed solids so cleaned would then be removed by the cleaning water stream by which then exits through one or both of the exit 44 or inlet 14 or one or a plurality of drains 63, which would normally be closed by a valve 24 or other selectively closeable valve means in the bottom of the vessel 12. Of course such valve means could be placed at any flange 15 intersection or in the assembled conduits to control fluid flow therethrough.

Fluid having made it through the first filtration zone 26 where the suspended solids 22 act as the filtration element, and past the secondary filtration zone 36, and through the containment screen 40 exits the other side of the screen through similar slots or orifices in the screen 40 as would be the case in a conventional retainment screen and thereafter exits the vessel 12 at the exit orifice 44 which may be controlled by a conventional fluid valve 24 to adjust flow characteristics through the device 10 separately or in conjunction with another valve means such as fluid valve 24 which may be placed at the entry into the vessel. The process through the device 10 yields a suspended solid 22 elimination in the form of sludge, equal to or in excess of 99.4 percent. Colorization caused by very small suspended solids 22 is also reduced by approximately 98 percent thus yielding clear and clean water, from what was initially wastewater.

Figure 3:
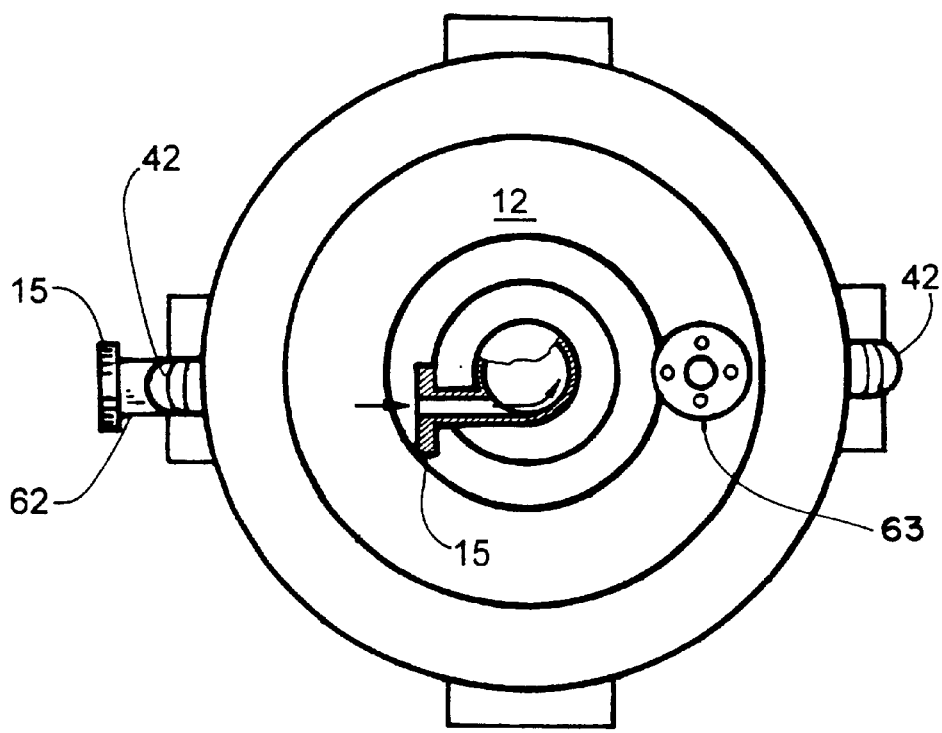
FIG. 3 is bottom view of the device with a cut away view of the tangential injection of fluid used to accelerate the fluid in the containers used in the device.
Figure 4:
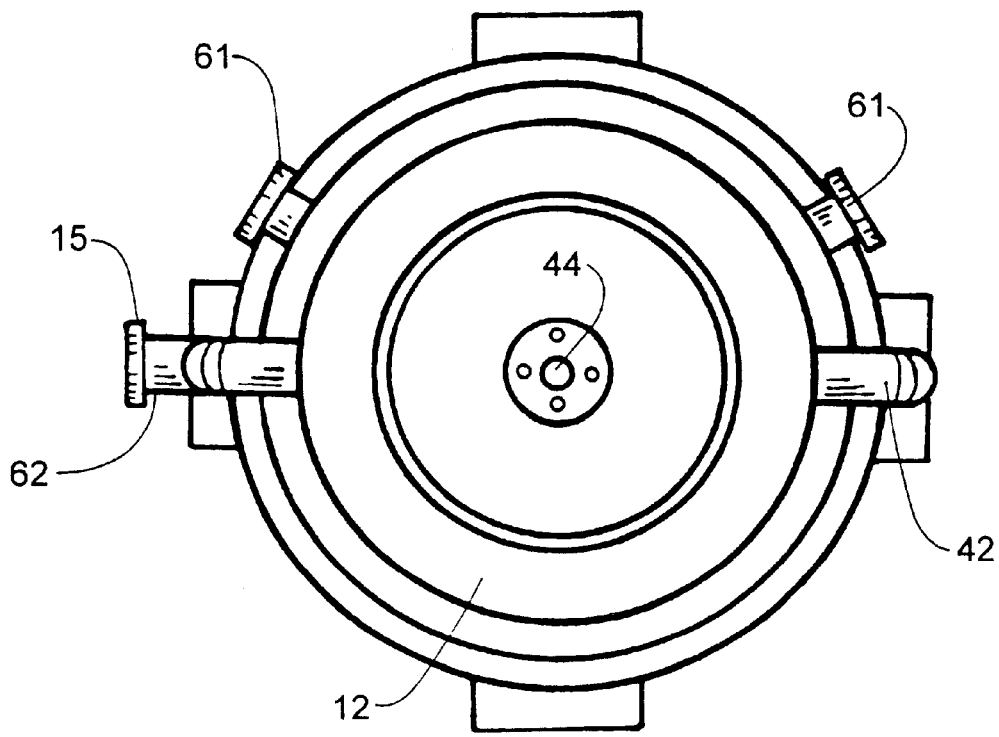
FIG. 4 is a top view of the device showing the return conduits and exit for fluid.
Figure 5:
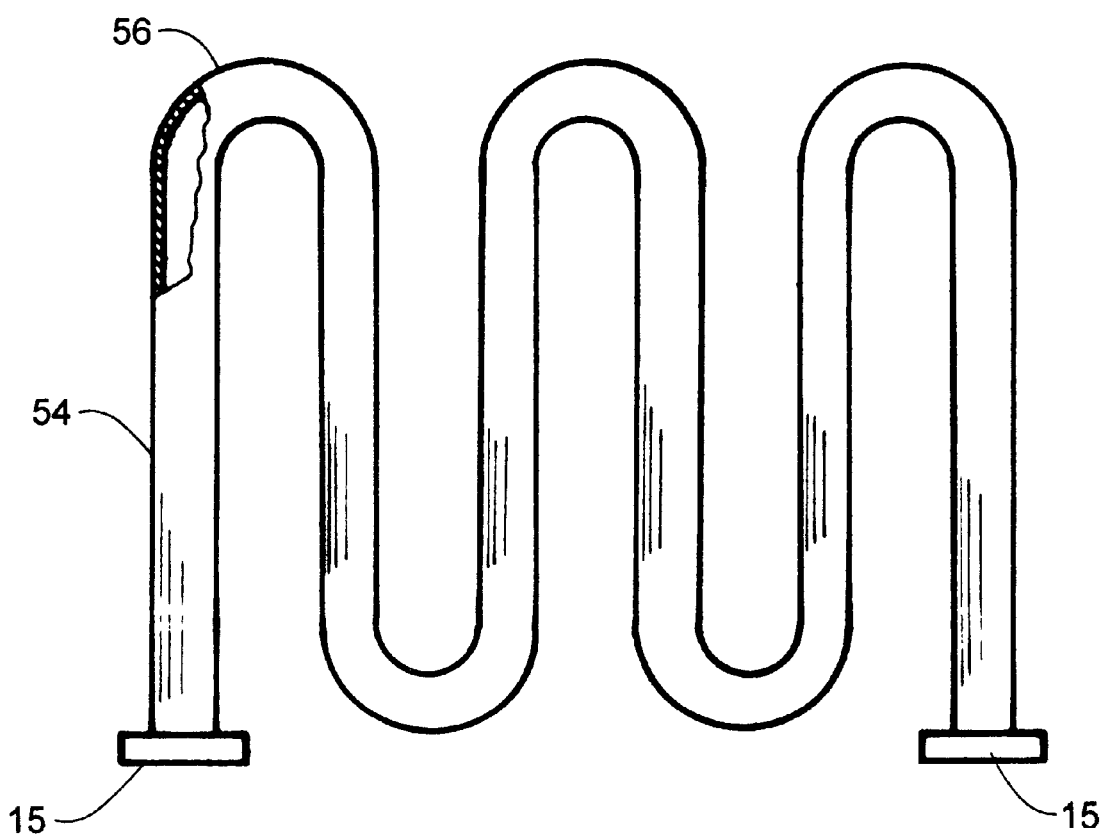
FIG. 5 is a side view of the curved pipe used for mixing of fluid entering the device.
Figure 6:
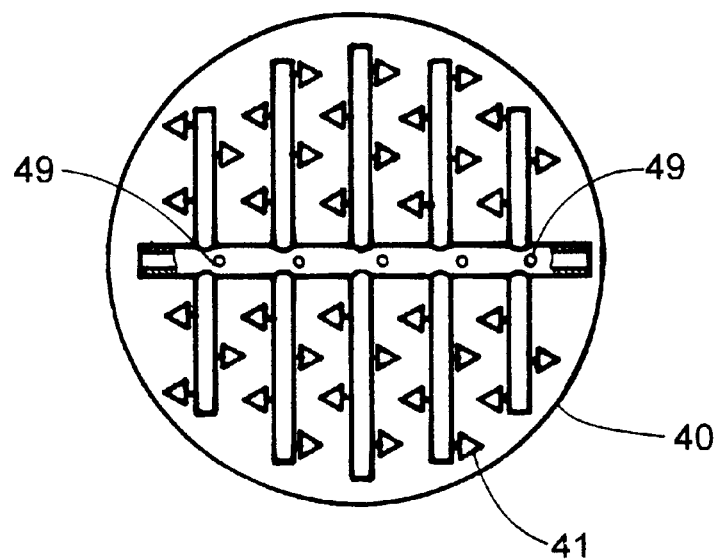
FIG. 6 is a view of the retaining screen used to retain the secondary filter level.
Figure 6A:
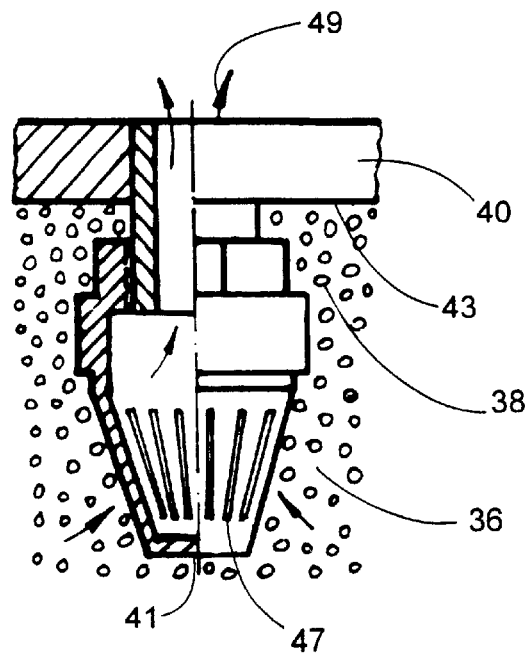
FIG. 6a is an enlargement of components of FIG. 6.
Figure 7:
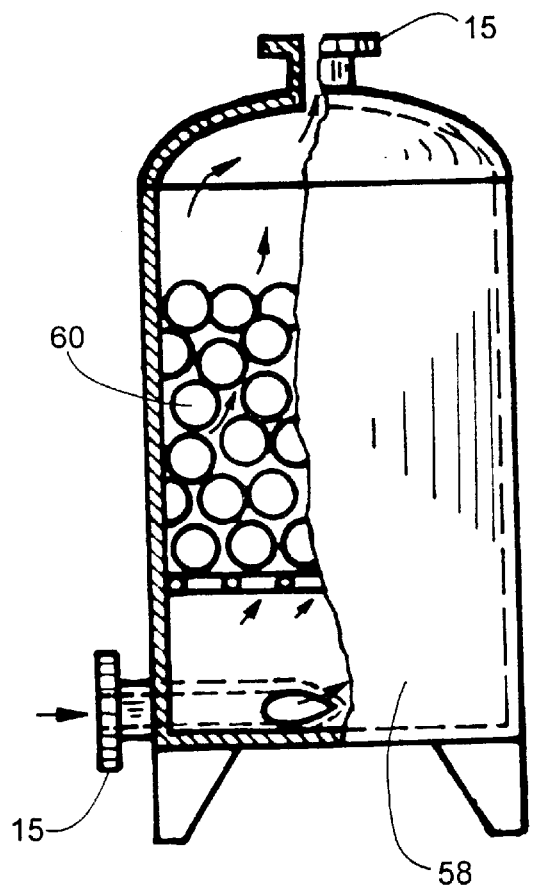
FIG. 7 depicts a container used as a first mixing device prior to entry into the vessel.

FIG. 3 depicts the bottom view of the device 10 showing a cut away of the tangential communication of the input conduit 14 through the wall of the vessel 12 to achieve optimum circulation of the wastewater stream with minimal energy. The same tangential communication is best used with the mixing container 58 communication with the fluid circuit also if the mixing container 58 is employed to help mix coagulant and solids prior to entry into the vessel 12. A conventional fluid energizing means such as a pump 45 is shown. Or, where electrical power is not available or prohibitive in cost, the wastewater source reservoir 50, if situated substantially 10 meters higher on the ground than the exit orifice 44 of the device 10, could provide the energizing means from gravity alone to allow flow through the device 10 in the aforementioned fashion. Such an fluid energizing means could be also provided by a small gas engine powering a pump in absence of electrical power. This ability to use minimal fluid pressure from an energizing means allows the device 10 to be used in applications that other devices requiring high pressures and fast fluid streams cannot, such as third world countries. Additionally, when used in a municipal sewage plant setting, the low energy requirements of the slow flow rate enhance the economy of the device to operate. The device can be increased or decreased in size to accommodate the flows required for the installation in which it is placed and still yield the same economic operating principals due to slow flow rates and taking advantage of natural pressure differentials.

Additional utility in the best mode of the device 10 is achieved by the addition of a coagulant means acting on the suspended solids in the fluid before entering the device 10. Mixing of the coagulant means in the form of coagulant 52 such as one or a combination of polyaluminum chloride and polyacrylamide with the wastewater is achieved in the current best mode of the device 10 using the mixing pipe 54 which features a plurality of bends 56 and is best situated perpendicular to the ground when in use for premixing. Upon exiting the mixing pipe, the fluid then circulates through a first mixing container 58 filled with porcelain balls 60 yielding a reaction through the Kelvin skin affect of the fluid speed flow through the first mixing container 58 to better aid mixing of the coagulant and the solids 22 in the fluid. This better allows the fluid stream to mix solids 22 throughly with the coagulants that aid in the clumping of solids 22 into larger solid particles in the wastewater for easier removal by subsequent circulation through the vessel 12 and formed filiation zones. Of course the vessel 12 might be employed to filter liquid without the inclusion of one or both of the mixing pipe 54 or the first mixing container 58 but the best results are yielded by their inclusion into a system as a whole as pictured in FIG. 1.

It is anticipated however that some but not all of the components including, the mixing pipe 54 and the first mixing container 58, and their addition of coagulant 52, and the vessel with one or two of the filtration zones, might be employed where less filiation is desired, and therefor the components might be used optionally separately or in combinations of with one or all of the other components. The best mode however, as disclosed herein features all of the mixing pipe 54 and the first mixing container 58 being in the fluid circuit providing coagulant 52 mixed with fluid with suspended solids to the vessel 12 which therein filters the solids from the liquid using one, or in the best mode both filtration layers. Further, while it might be eliminated by some skilled in the art who would use the other components of the device alone or separately to achieve partial elimination of solids for a purpose not requiring the best filtration, the use of the coagulant 52 further enhances the performance of the device 10 and would be used in the current best mode along with the other aforementioned components in a unit.

While all of the fundamental characteristics and features of the Applicants' High Turbidity Wastewater Purification System and Method therefor invention have been shown and herein described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A fluid purification apparatus comprising:

a fluid vessel, said vessel having a upper portion, a bottom portion, a center axis, and an interior cavity;

said interior cavity defined by a top wall, a bottom wall, and a sidewall, said sidewall being substantially circular about the circumference of said vessel;

a vessel exit conduit, said vessel exit conduit communicating with said interior cavity at a connection at said upper portion of said vessel;

a vessel input conduit, said input conduit communicating with said interior cavity at said bottom portion of said vessel, said input conduit attachable to a pressurized fluid stream containing fluid and suspended solids;

said pressurized fluid stream when attached to said vessel through said input conduit, flowing through said vessel from said bottom portion toward said upper portion;

a collector, said collector having a top end, and a lower end, and a collector cavity defined by the area between said top end, said lower end, and a collector cavity sidewall, said collector communicating with the interior cavity of said vessel at a collector orifice formed at said top end of said collector cavity;

means for regulation of said flow of said pressurized fluid stream from said bottom portion toward said upper portion of said vessel to yield a determined rise point of said suspended solids in said interior cavity of said fluid vessel;

a first filter in said interior cavity at said determined rise point, said first filter formed of a layer of said suspended solids in said fluid stream reaching said determined rise point;

said first filter layer bifurcating said fluid stream into a first flow path and a second flow path;

said first flow path containing fluid and substantially all of said suspended solids flowing into said collector cavity through said collector orifice and exiting said collector cavity through an exit channel communicating said first flow outside said vessel; and said second flow path of said fluid stream substantially free of said suspended solids, flowing from said determined rise point toward said upper portion of said vessel and exiting said vessel through said exit conduit;

a secondary filter zone, said secondary filter zone formed of filtration components;

said filtration components formed of a material which is both buoyant and non soluble in said fluid;

said filtration components rising in said fluid stream in said interior cavity toward said upper portion of said vessel to a containment screen attached to the circumference of said sidewall of said interior cavity;

said secondary filter zone having an inlet face wherein said filter stream enters said secondary filter zone and an outlet face adjacent to said containment screen whereby substantially all remaining suspended solids in said second flow path of said fluid stream, adhere to said filtration components thereby being filtered from said fluid stream traversing said secondary filter zone from said inlet face and exiting through said outlet face; and one or a plurality of return conduits communicating fluid from said exit channel into said secondary filter zone at a point between said inlet face and said outlet face of said secondary filter, whereby additional fluid is extracted from said first flow path circulating in said exit channel into said second flow path.

2. The fluid purification device as defined in claim 1 wherein said collector cavity has a collector center axis substantially in line with said vessel center axis and said collector cavity sidewall is substantially parallel to said fluid vessel sidewall.

3. The water purification device as defined in claim 2 wherein said exit channel comprises a storage cavity, said storage cavity having a storage cavity interior;

a upper portion of said storage cavity interior communicating with said collector cavity of said collector at the lower end of said collector through communicating tubes;

said storage cavity having a drain orifice communicating outside said vessel through at least one storage cavity exit orifice.

4. The fluid purification device as defined in claim 3 constructed as a unitary structure with said storage cavity formed inside said vessel.

5. The fluid purification device as defined in claim 1 wherein said exit channel comprises a storage cavity, said storage cavity having a storage cavity interior;

a upper portion of said storage cavity interior communicating with said collector cavity of said collector at the lower end of said collector through communicating tubes;

said storage cavity having a drain orifice communicating outside said vessel through at least one storage cavity exit orifice.

6. The fluid purification device as defined in claim 5, wherein said one or plurality of return conduits communicate with said exit channel at said upper portion of said storage cavity interior and with said secondary filter zone at a point between said inlet face and said outlet face.

7. The fluid purification device as defined in claim 1 wherein said pressurized fluid stream containing fluid and suspended solids is mixed with a coagulant prior to communication with said vessel through said input conduit, said coagulant causing said suspended solids in said fluid stream to form larger particles therein.

8. The fluid purification device as defined in claim 7 wherein said coagulant is mixed with said fluid stream, using a mixing pipe, said mixing pipe extending perpendicular to the ground when in use and having a plurality of bends in said mixing pipe.

9. The fluid purification device as defined in claim 7 wherein said bends are substantially at angles of 180 degrees.

10. The fluid purification device as defined in claim 7 wherein said coagulant is mixed with said fluid stream using a mixing container, said mixing container being substantially filled with porcelain balls.

11. The fluid purification device as defined in claim 7 wherein said fluid is water and said coagulant is one or a combination of coagulants from a group consisting of polyaluminum chloride and polyacrylamide.

12. The fluid purification device as defined in claim 1 wherein said means for regulation of said flow of said pressurized fluid stream from said bottom portion toward said upper portion of said vessel to yield a determined rise point of said suspended solids in said interior cavity of said fluid vessel is a valve at said input conduit, said valve being adjustable to thereby adjust the volume and pressure of fluid flowing therethrough into said vessel.

13. The fluid purification device as defined in claim 1 additionally comprising a fluid backwash orifice communicating with said interior cavity at said upper portion of said fluid vessel whereby said secondary filter zone may be cleaned using a flow of fluid through said fluid backwash orifice which exits through one or a plurality of said exit channel and said exit conduit.

14. The fluid purification device as defined in claim 1 additionally comprising said vessel being an inverted bell shape with being narrower at said bottom portion and wider than said bottom portion at said upper portion.

15. The fluid purification device as defined in claim 1 additionally comprising said pressurized fluid stream being pressurized by a pump.

16. The fluid purification device as defined in claim 1 additionally comprising said pressurized fluid stream being pressurized by a fluid supply reservoir having an elevation higher than the vessel exit conduit.

17. The fluid purification device as defined in claim 1 wherein said device is used to clean wastewater emanating from a ceramics plant.

* * * * *

UNITED STATES PATENT AND TRADEMARK OFFICE
CERTIFICATE OF CORRECTION

PATENT NO. : 6,358,407 B1  
DATED : March 19, 2002  
INVENTOR(S) : Taiquan Liao, Chunjiang Liao and Manhoi Lam Page 1 of 1

It is certified that error appears in the above-identified patent and that said Letters Patent is hereby corrected as shown below:

Title page,
Item [75] please correct name of the first inventor to read as follows:
-- Taiquan Liao --

Signed and Sealed this

Twenty-eighth Day of May, 2002

*Attest:*

JAMES E. ROGAN
*Attesting Officer*         *Director of the United States Patent and Trademark Office*